(12) United States Patent
Tan et al.

(10) Patent No.: US 11,742,676 B2
(45) Date of Patent: Aug. 29, 2023

(54) ACTUATING MECHANISM WITH INTEGRAL BATTERY

(71) Applicant: ROTORK CONTROLS LIMITED, Bath (GB)

(72) Inventors: Nian You Tan, Bath (GB); Jonathan Wiggins, Bath (GB); David Ware, Bath (GB)

(*) Notice: Subject to any disclaimer, the term of this patent is extended or adjusted under 35 U.S.C. 154(b) by 260 days.

(21) Appl. No.: 16/762,480

(22) PCT Filed: Oct. 26, 2018

(86) PCT No.: PCT/GB2018/053115
§ 371 (c)(1),
(2) Date: May 7, 2020

(87) PCT Pub. No.: WO2019/092400
PCT Pub. Date: May 16, 2019

(65) Prior Publication Data
US 2021/0184489 A1   Jun. 17, 2021

(30) Foreign Application Priority Data
Nov. 7, 2017  (GB) ..................... 1718372

(51) Int. Cl.
*H02J 7/00* (2006.01)
*H02P 29/68* (2016.01)
(Continued)

(52) U.S. Cl.
CPC ......... *H02J 7/0042* (2013.01); *H01M 10/443* (2013.01); *H01M 10/486* (2013.01);
(Continued)

(58) Field of Classification Search
CPC ......... H05B 45/10; H05B 47/19; F16K 31/04; H02P 29/68; Y02E 60/10; G11B 5/1272
(Continued)

(56) References Cited

U.S. PATENT DOCUMENTS

| | | |
|---|---|---|
| 2003/0141844 A1 | 7/2003 | Fiebig et al. |
| 2005/0236594 A1* | 10/2005 | Lilly ............ F16K 31/02 137/557 |

(Continued)

FOREIGN PATENT DOCUMENTS

| | | |
|---|---|---|
| CN | 203880188 U | 10/2014 |
| CN | 204532249 U | 8/2015 |

(Continued)

OTHER PUBLICATIONS

GB Search Report for Application No. GB1718372.4, dated May 2, 2018; 2 pgs.

(Continued)

*Primary Examiner* — Kawing Chan
*Assistant Examiner* — Zemenay T Truneh
(74) *Attorney, Agent, or Firm* — Polsinelli, PC; Elton F. Dean, III

(57) ABSTRACT

A motor driven industrial actuator device includes an enclosure that houses: a motor, a control module, a drive, a battery pack and associated temperature sensor, and an input that receives an external power supply. The control module receives: the status of the external power supply, the charge state of the battery pack, the status of the battery pack, or the charge state and status of the battery pack. The control module causes the battery pack to be charged when an external power supply is present and the battery pack requires charging. During charging of the battery pack, the control module: receives the temperature associated with the battery pack from the temperature sensor; compares the measured temperature with a predetermined threshold temperature; and reduces the current to the battery pack if the measured temperature is greater than the predetermined threshold temperature.

15 Claims, 4 Drawing Sheets

(51) Int. Cl.
  *H01M 10/44*    (2006.01)
  *H01M 10/48*    (2006.01)
  *H02J 50/00*    (2016.01)
  *H05B 45/10*    (2020.01)
(52) U.S. Cl.
  CPC .......... *H02J 7/0013* (2013.01); *H02J 7/0048* (2020.01); *H02J 7/007194* (2020.01); *H02J 50/00* (2016.02); *H02P 29/68* (2016.02); *H05B 45/10* (2020.01)
(58) Field of Classification Search
  USPC .......................................................... 318/139
  See application file for complete search history.

(56)  References Cited

U.S. PATENT DOCUMENTS

| | | |
|---|---|---|
| 2009/0101341 A1 | 4/2009 | Willauer |
| 2009/0211160 A1 | 8/2009 | Tehranchi |
| 2010/0217443 A1 | 8/2010 | Hagler |
| 2012/0306448 A1 | 12/2012 | Lu et al. |
| 2013/0113440 A1 | 5/2013 | Narita |
| 2014/0068310 A1 | 3/2014 | Sultenfuss et al. |

FOREIGN PATENT DOCUMENTS

| | | | |
|---|---|---|---|
| CN | 106949289 A | 7/2017 | |
| EP | 0923013 A1 | 6/1999 | |
| EP | 2367261 A2 | 9/2011 | |
| EP | 3091170 A1 | 11/2016 | |
| GB | 2545280 | * 12/2015 | ............... H02J 7/00 |
| GB | 2545280 A | 6/2017 | |
| KR | 10-2003-0065381 A | 8/2003 | |
| KR | 10-2013-0080283 A | 7/2013 | |
| RU | 2355069 C2 | 11/2005 | |
| RU | 2600567 C2 | 3/2012 | |
| WO | 2010/083058 A1 | 7/2010 | |
| WO | 2013/077157 A1 | 5/2013 | |
| WO | 2015061382 A1 | 4/2015 | |
| WO | 2015/155939 A1 | 10/2015 | |
| WO | 2019/092400 A1 | 5/2019 | |

OTHER PUBLICATIONS

GB Further Search Report for Application No. GB1718372.4, dated Sep. 6, 2018; 2 pgs.

International Search Report and Written Opinion relating to International Application No. PCT/GB2018/053115, dated Jan. 7, 2019; 13 pgs.

Indian Office Action dated May 10, 2021 for corresponding Indian Application No. 202047020973; 6 pages.

Actuated Valve Supplies / Valbia: Valbia Plastic 270Nm electric Valve Actuator, Type VB270; Doc: AVS-VB270-2016 Rev.0 Aug. 2016.

* cited by examiner

ACTUATING MECHANISM WITH INTEGRAL BATTERY

CROSS-REFERENCE TO RELATED APPLICATIONS

This application is a U.S. National Stage Application of International Application No. PCT/GB2018/053115, filed Oct. 26, 2018, which claims priority from Great Britain Patent Application No. 1718372.4, filed Nov. 7, 2017, the entire contents of which are hereby incorporated by reference in their entirety.

FIELD OF THE INVENTION

This invention relates generally to a motor-driven actuator mechanism, such as a valve actuator, including an integral battery.

BACKGROUND OF THE INVENTION

The power source applied to a motor-driven actuating mechanism, such as a valve actuator, is usually provided by an AC mains supply. However, it is known to provide a (often external) battery backup in such devices to provide valve failsafe operation by utilising power from a battery source during AC supply mains failure. Thus, in such devices, under normal supply conditions, the actuator operates from the site AC electrical supply. However, in the event that this supply is lost, the actuator automatically switches over to receive power from a battery supply, allowing control of the valve to a (often externally) pre-configured (failsafe) position.

However, the battery used in such devices is external to the actuator, a passive device and it is of a type that is not generally suitable for use in Explosionproof (EP) environments. There is little or no active monitoring or operation of the battery, and it certainly could not be considered suitable to act as the sole power supply for effecting normal operation of the valve actuator.

It is an object of aspects of the present invention to address at least some of these issues.

SUMMARY OF THE INVENTION

In accordance with a first aspect of the present invention, there is provided a motor driven industrial actuator device comprising an enclosure in which a motor, a control module and a drive is housed, said drive being coupled between a motor and said external device being actuated, the device further comprising an input for receiving an external power supply and a battery pack housed within said enclosure, the battery pack being electrically connected to selectively drive said motor and electrically connectable to said external power supply for charging, the control module being configured to receive data representative of a status of said external power supply, receive data representative of a charge state and/or status of said battery pack, and cause said battery pack to be charged from said external power supply when an external power supply is determined to be valid and present and said battery pack requires charging, the device further comprising at least one temperature sensing device associated with said battery pack, the control module being further configured, during charging of the battery pack to:

receive from said at least one temperature sensing device, data representative of a measured temperature associated with said battery pack;

compare said measured temperature with a first predetermined threshold temperature; and if said measured temperature is greater than said first predetermined threshold temperature, cause a charging current delivered from said external power supply to said battery pack to be reduced to prolong the life of the battery pack.

In an exemplary embodiment, if said measured temperature is greater than said first predetermined temperature, the control module may be configured to cause a charging current delivered from said external power supply to said battery pack to be reduced until said measured temperature is at or below said first predetermined threshold temperature.

The battery pack may, optionally, comprise a plurality of secondary lithium/nickel metal hydride/nickel cadmium cells arranged and configured for use in Explosionproof environments.

In accordance with another aspect of the present invention, there is provided a motor driven industrial actuator device comprising an enclosure in which a motor, a control module and a drive is housed, said drive being coupled between a motor and said device being actuated, the device, optionally, further comprising an input for receiving an external power supply and a battery pack housed within said enclosure, said battery pack being electrically connected to selectively drive said motor and electrically connectable to said external power supply for charging, said battery pack comprising a plurality of secondary lithium/nickel metal hydride/nickel cadmium cells arranged and configured for use in Explosionproof environments.

The motor-driven actuator device may further comprise a balanced charging circuit and a circuit configured to provide over voltage, over current and under voltage protection in respect of said battery cells.

An exemplary embodiment of the invention may further comprise at least one heating device associated with said battery pack, and wherein said control module is further configured, during charging of said battery pack, to compare said measured temperature with a second predetermined threshold temperature and, if said measured temperature is less than said second predetermined threshold temperature, cause said at least one heating device to be switched on until said measured temperature is at or above said second predetermined threshold temperature.

In some exemplary embodiment, the external power supply may be a renewable and/or harvested energy source.

The control module may be configured to communicate a battery pack charge level, battery pack status and/or faults to a user, visually remotely and/or via a network, optionally in the form of a data log.

The control module may, optionally, be configurable to operate in a plurality of modes, events and actions of operation in addition to a shutdown mode. Optionally, the control module may be configured to prevent actuator operation should said control module determine a fault condition in said battery pack and/or determine that the charge level of the battery pack is below that able to allow a shutdown event.

The above-mentioned plurality of modes, events and actions of operation may include battery actuation and self contained modes; mains shutdown, battery shutdown and battery actuation events.

In an exemplary embodiment of the invention, in a shutdown mode, the control module is configured to move said actuator to any other mid position and/or any other limit of movement.

Optionally, in the above-mentioned battery actuation mode, the control module may be configured to cause the external power supply to operate the ancillary systems of said actuator device, including causing said battery pack to be charged by said external power supply until it receives a move command and, in response to a said move command, causes said battery pack to cause said actuator to be moved under power from the battery pack, in the form of a battery actuation event, and said battery pack to be discharged.

In accordance with another aspect of the present invention, there is provided a battery management module for a motor-driven device comprising an enclosure in which a motor and a drive is housed, said drive being coupled between a motor and said device being actuated, the device further comprising an input for receiving an external power supply and a battery pack housed within said enclosure, said battery pack being electrically connected to selectively drive said motor and electrically connectable to said external power supply for charging, the battery management module being configured to receive data representative of a status of said external power supply, receive data representative of a charge state and/or status of said battery pack, and cause said battery pack to be charged from said external power supply when an external power supply is determined to be valid, present and said battery pack requires charging, the device further comprising at least one temperature sensing device associated with said battery pack, the battery management module being further configured, during charging of the battery pack to:

receive from said at least one temperature sensing device, data representative of a measured temperature associated with said battery pack;

compare said measured temperature with a first predetermined threshold temperature; and if said measured temperature is greater than said first predetermined threshold temperature, cause a charging current delivered from said external power supply to said battery pack to be reduced to prolong the life of the battery pack.

An exemplary embodiment of the battery management module may be configurable to operate in a selected one of a plurality of modes, events and actions of operation, in addition to a shutdown mode.

The above-mentioned modes may include battery actuation and self contained modes, mains shutdown, battery shutdown and battery actuation events.

The above-mentioned shutdown mode may be selectively configured to move said actuator to any other mid position or any other limit of movement.

In an exemplary embodiment of the battery management module, during charging of said battery pack, said module may be configured to receive data representative of a measured life and cell impedance of said battery pack, compare said data with a predetermined profile of performance, and if said measured cell impedance is greater than said predetermined profile, cause the charge voltage thereto to be reduced.

Optionally, during discharge of said battery pack, said battery management module may be configured to receive data representative of a measured temperature associated with said battery pack, compare said measured temperature with a predetermined threshold temperature and, if said measured temperature is less than said predetermined threshold temperature, cause the discharge lower voltage limit to be reduced.

Optionally, during discharge of said battery pack, the battery management module may be configured to receive data representative of a measured temperature associated with said battery pack, compare said measured temperature with a predetermined second threshold temperature and, if said measured temperature is less than said predetermined temperature, cause a heating device associated with a said battery pack to be switched on.

An exemplary embodiment of the battery management module may be configured to detect and determine the validity of said external power supply and:

(i) if the external power supply is valid and a valid shutdown command has been received, cause an external power supply powered shutdown event to be effected; and (ii) if the external power supply is not valid or determined to become invalid, and/or a valid shutdown command has been received, cause a battery shutdown event causing said battery to be discharged.

(iii) a mains shutdown event is underway, switch from the external power supply powered shutdown event to a battery shutdown event causing said battery to be discharged.

Optionally, the battery management module may be configured to enable a motor-driven actuator device to operate normally, with the battery pack in either an idle or charge state unless the external power supply is determined to be invalid and/or a valid shutdown command is received, such that an external power supply powered shutdown event or a battery shutdown event is effected accordingly.

BRIEF DESCRIPTION OF THE DRAWINGS

Embodiments of the present invention will now be described, by way of examples only, and with reference to the accompanying drawings, in which.

DETAILED DESCRIPTION

Exemplary embodiments of the present invention are more particularly concerned with actuators of the type that find wide application as valve and damper actuators in, for example, the power generation industries, oil and gas flow control, marine applications, water utilities and processing industries. Such valve actuators generally have an output shaft driven by a reversible electric motor through gearing, e.g. worm and wheel gearing, and which can move the output shaft in either direction to open or close a valve connected via a valve stem to the output shaft.

Figure 1:
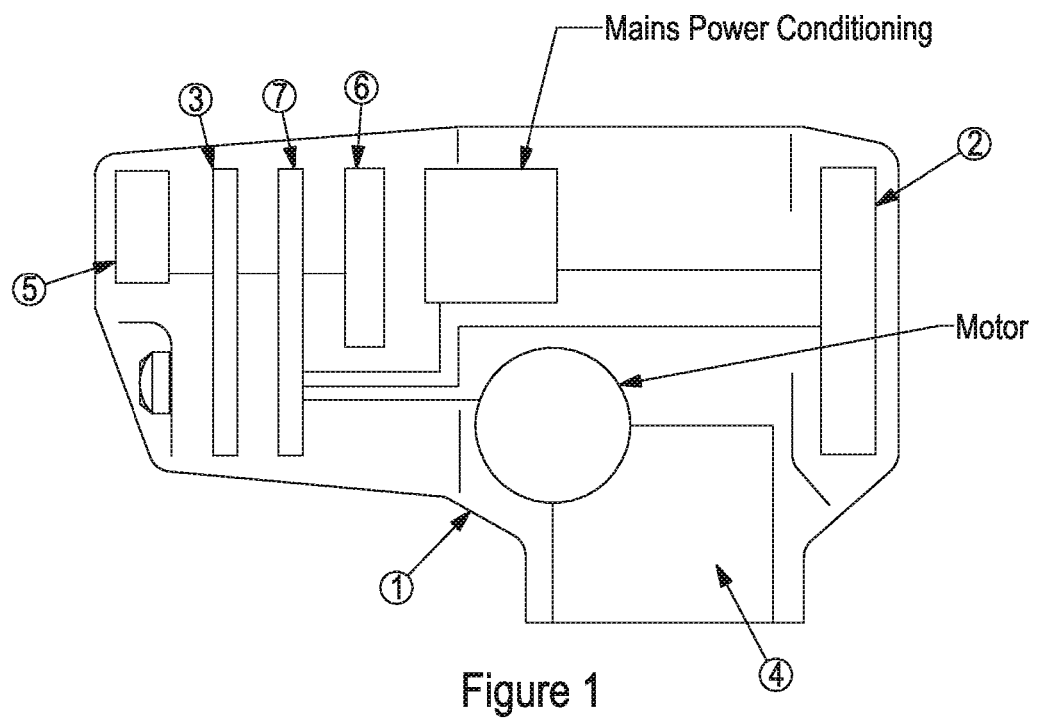
FIG. 1 is a schematic diagram illustrating a valve actuator according to an exemplary embodiment of the present invention.

Referring to FIG. 1 of the drawings, a valve actuator according to an exemplary embodiment of the present invention is illustrated and comprises a main enclosure 1 and a terminal enclosure 2. The enclosures may be hermetically sealed to maintain watertight integrity and protect the internal components therein. The main enclosure houses control modules 3, such as a position control device and load sensor, as well as the drive train 4. A display and local controls 5 may be housed within a cover on the main enclosure.

A battery pack 6 is mounted within the main enclosure and electrically connected to the actuating mechanism, and the actuator further comprises a battery control module 7 for management of the battery pack and operation of the actuating mechanism. The battery pack comprises a plurality of cells, such as Secondary Lithium cells, typically wired in series with diode protection between the cells. Methods of wiring multiple Secondary Lithium cells to form a battery pack, and wiring configurations therefor, will be known to a person skilled in the art.

The precise number of cells used, and the wiring configuration utilized, will be dependent, to some extent at least, on the capacity and power to be achieved, and also on the space available to house the resultant battery pack, and the present invention is not necessarily intended to be limited in this regard. Secondary Lithium cells are considered advantageous for use in a valve actuator of the type described above as they are suitable for use in Explosionproof (EP) devices. However, the present invention is not strictly intended to be limited in this regard, and other suitable cell types, such as nickel-metal hydride or nickel-cadmium, will be apparent to a person skilled in the art.

In a battery pack of the type described above, it is known to provide a smart balancing charge circuit that, in addition, protects the battery cells from being over-charged, over-discharged or becoming too discharged (also known as over voltage, over current and under voltage protection respectively). Circuits for this purpose are known in other technical fields, and will not be discussed in any further detail herein. Suffice it to say that a person skilled in the art of battery pack design will be sufficiently familiar with electronic balance charging circuits and over voltage, over current and under voltage protection methods, to select and implement a suitable arrangement according to the cell configuration/wiring method used/capacity and power capability required, and specification of the valve actuator.

Secondary battery cells have a limited optimum temperature range, and additional circuitry is provided to protect against over-temperature, together with thermal vents in the cell housing.

Figure 2:
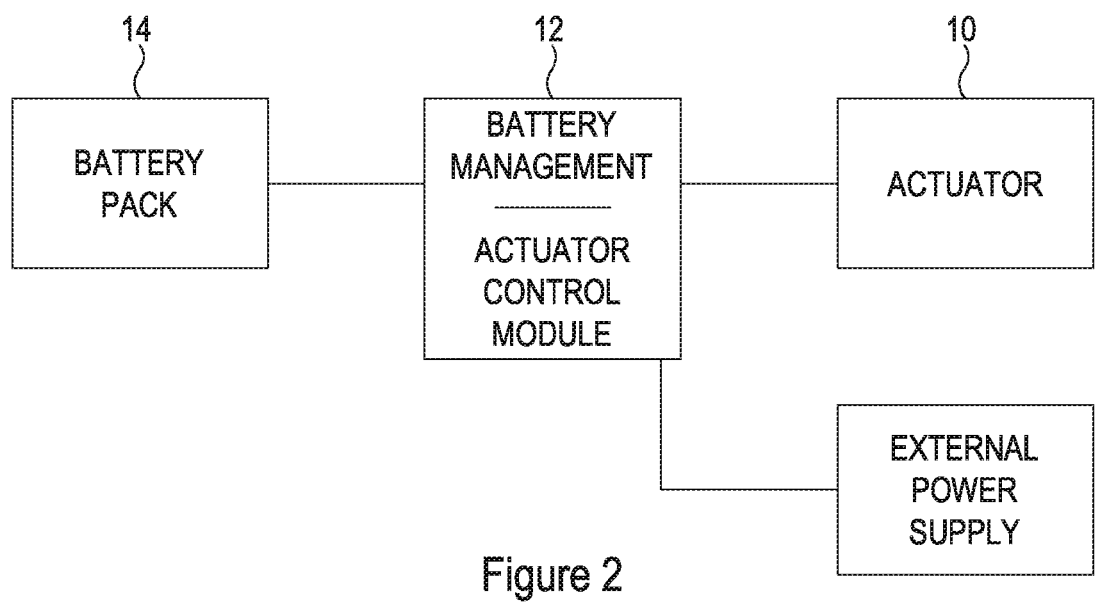
FIG. 2 is a schematic block diagram illustrating the configuration of an actuator, battery pack and actuator control module of a valve actuator according to an exemplary embodiment of the present invention.

Referring to FIG. 2 of the drawings, there is illustrated, in block diagram form, an actuator 10, control module 12 and battery pack 14 configuration according to an exemplary embodiment of the present invention. The control module 12 may incorporate the above-referenced balanced charging and over voltage, over current and under voltage protection functionalities, although this is not essential, and these functions may be provided in a separate module/PCB. In the description that follows, the principal features of the battery management function of an actuator control module according to an exemplary embodiment of the present invention will be described, and it is to be understood that the actuator control module 12 may or may not include other functionality not described in detail herein. Furthermore, the above-referenced principal features are all described as being part of the same actuator control module, but the actuator control module functionality may, of course, be provided in modular form, with one or more of the functions being provided in separate devices/PCBs, and/or remote from other functions, and the present invention is not necessarily intended to be limited in this regard.

The valve actuator exemplary embodiments of the invention, and particularly the battery pack used therein, has three modes of operation referred to herein as 'Shutdown', 'Battery Actuation' and 'Self Contained', as well as five actions of operation: 'Normal', 'Mains Shutdown', 'Battery Shutdown', 'Battery Actuation' and 'Self Contained' and several Resulting action types, each of which are underpinned by the integration of a battery pack of the type described above within a valve actuator and coupled thereto via a battery management function provided as part of an actuator control module. In exemplary embodiments of the invention, all of the above-mentioned modes can be accomplished using the same hardware, using different respective (switchable) configurations. Additional hardware may be used for the 'Self Contained' mode of operation to transform typically solar energy to electrical energy (in a manner known to a person skilled in the art).

The following is a description of the Battery Management system. This exemplary case is within the Shutdown mode with Normal, Mains Shutdown and Battery Shutdown events of operation and Command and Power loss actions as will be described in more detail hereinafter, however many aspects relate to all modes, events and actions of operation.

The control module, and associated battery management process flow, provides (in respect of the battery pack) active voltage and current management, diagnostics (located within the valve actuator), status feedback functionality, low temperature management (using heaters to assist performance and maintain the battery cells within their optimum operating temperature range), and high temperature management to extend the operating lifespan of the battery cells. In this exemplary embodiment, the valve actuator (and associated battery pack and control module) would be suitable for use in EP and non-EP environments in temperature ranges from −50° to 70° C.

The battery pack is interrogated by the battery management (or 'actuator control') module to determine battery temperature, battery capacity, battery voltage and level of charge remaining within the battery pack/cells. The present invention is not limited in terms of the manner in which these parameters are determined; the principal utility and advantage of the control module according to this exemplary embodiment of the invention is that it uses these sensed/calculated parameters to manage the battery pack, make decisions and take the best actions for the user and/or the battery pack based on these parameters, and/or report a battery pack fault based on these parameters within a technical field where this level of battery management has not previously been possible. One of the principal benefits, of course, is that it has not previously been practical to use a battery pack in a valve or damper actuator that complies with EP regulations outside of specific cases. Whereas Secondary Lithium and similar battery cell technologies are able to be utilised in EP (and other) hazardous environment applications, their optimum operating temperature range is limited and they require careful management (especially when charging and discharging). Thus, in accordance with one aspect of the present invention, these issues are addressed. Protection for over temperature is provided, both via electronic means and using thermal vents in the cell housing. The battery pack additionally uses heaters when the ambient temperature drops below a predefined (and configurable) point set by the actuator control module. These measures can, therefore, be utilised to maintain the battery cells at an optimum working temperature for both charging and discharging, and can be selectively switched on and off by the actuator control module when required. At high temperatures, the actuator control module can take the decision as to when to charge the battery pack and the rate at which to charge the battery pack, thereby facilitating extended operating temperature ranges and extending the battery pack life.

Furthermore, over the life of the valve actuator, the battery pack will, inevitably, degrade. The actuator control module may have an inbuilt map of such degradation and, combined with battery capacity sensing, the actuator control module can vary the charge level and voltage to maximise the battery life and performance at different stages in its lifespan. Additionally, there may be an inbuilt map of the battery capacity with temperature which can be used to allow the control module to compensate for differing temperature conditions.

Thus, an actuator control module (incorporating a battery management function) according to an exemplary embodiment of the present invention is communicably coupled to an integral battery and configured to monitor and control the battery operation according to a mode of operation and a plurality of associated respective parameters, as will be described in more detail hereinafter.

Figure 3:
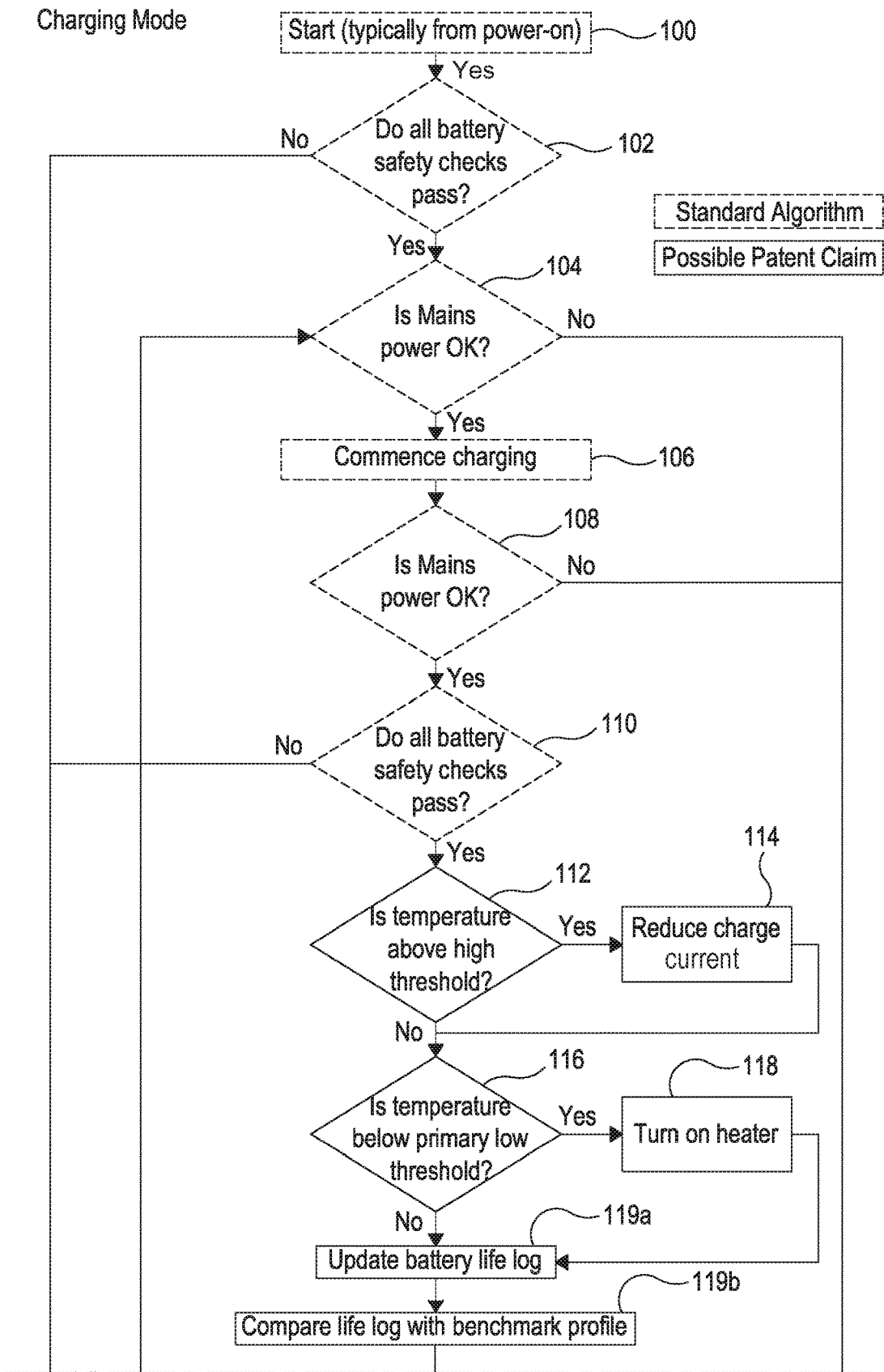
FIG. 3 is a schematic flow diagram illustrating a method of battery management according to an exemplary embodiment of the present invention.
Figure 3:
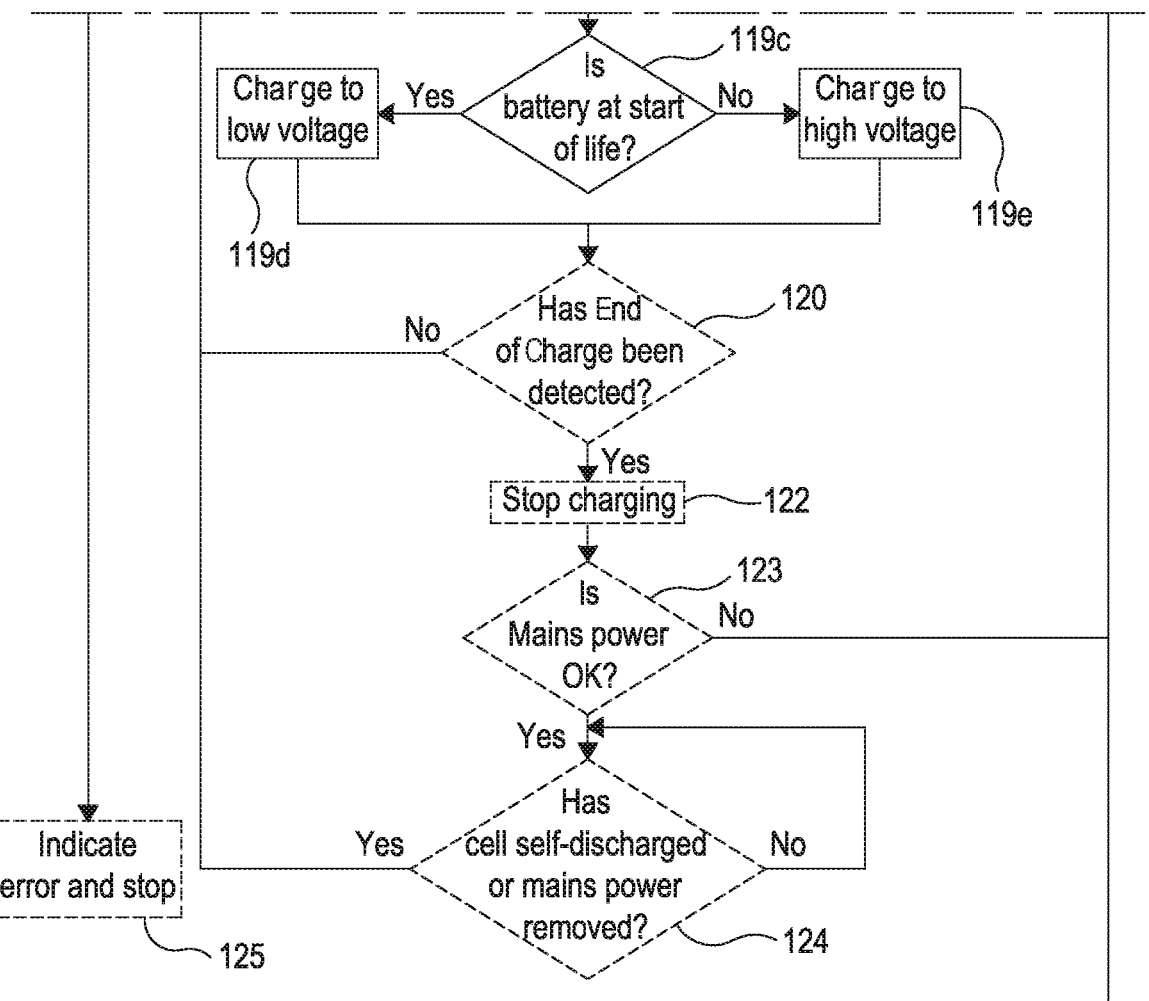
Figure 3:
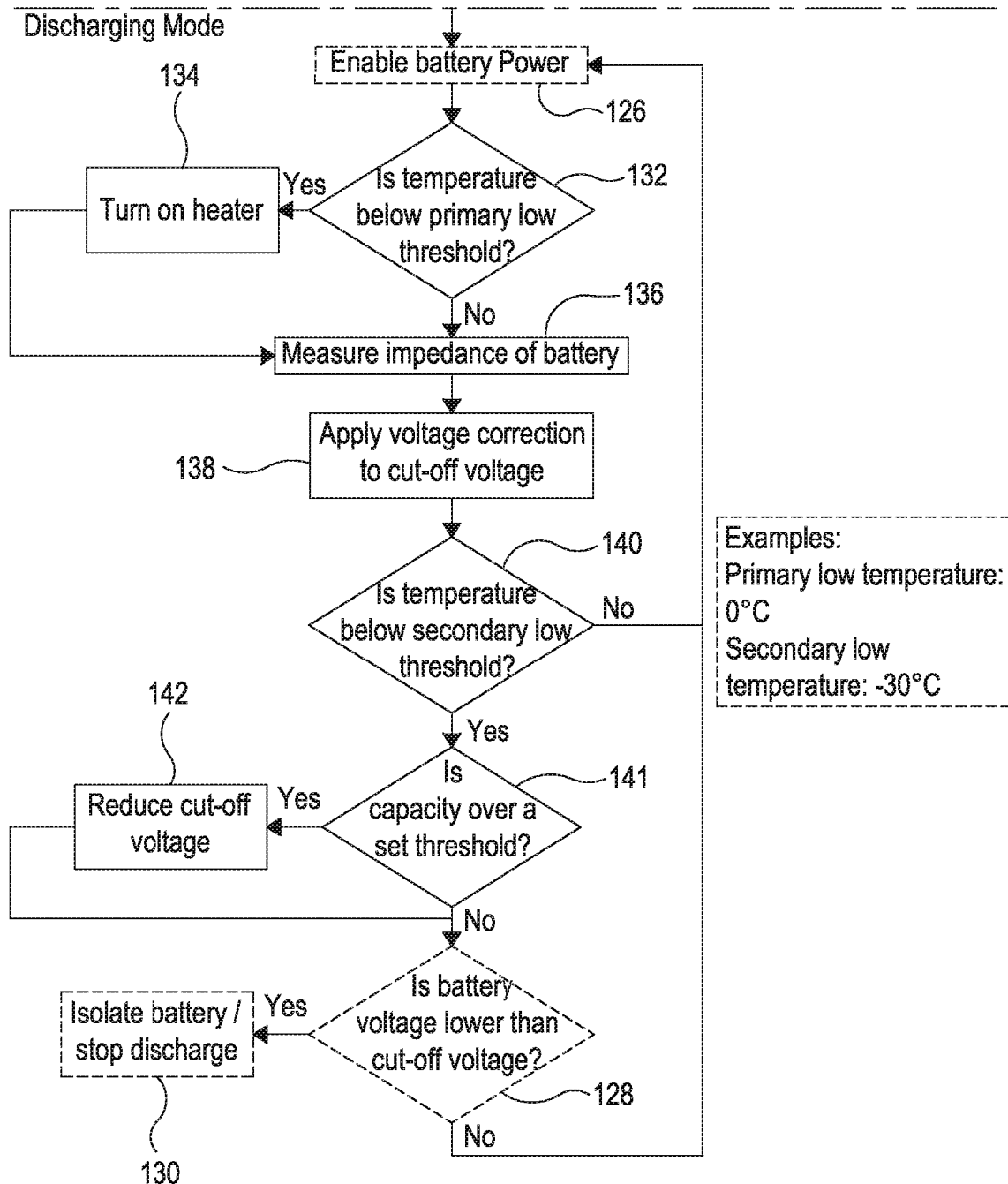

Referring now to FIG. 3 of the drawings, a battery management (or control) module, and method of battery management, according to an exemplary embodiment of the present invention will now be described in more detail in relation to the illustrated flow diagram. The battery management flow diagram starts at step 100, wherein the subsequent charging process flow is typically (although not essentially) triggered when the module is powered on or after the battery pack has been in an idle state.

Once the process flow has started, the actuator control module checks the status (at step 102) of the battery pack for the following parameters:
Charge level
Temperature
Faults
  Under voltage
  Over voltage
  Over temperature
Cell status and/or service/maintenance requirements The actuator control module selects an Event and Action mode of operation based on the current status of the mains power level, as well as whether or not the battery pack is safe to use, whether or not the actuator is safe to run and whether the battery pack requires charging. Thus, at step 104, the actuator control module checks whether or not the mains power connected to the valve actuator is valid (i.e. sufficient to drive the motor, run the peripheral functions of the valve actuator and charge the battery pack (if required)).

If (or while) it is determined that the mains power present is valid, the battery is safe to use and is fully charged, and the actuator is safe to run, the valve actuator operates as a conventional motor-driven valve actuator, defined herein as 'Normal' events of operation, powered by the mains power present, and with the battery pack in an idle state (and configured to provide the required valve failsafe operation in the event of a respective command, power loss, actuator fault, etc).

If it is determined that the mains power present is not valid (i.e. not present or below a defined level), and/or a valid failsafe command is received, but the battery is safe to use, the actuator is safe to run and there is sufficient charge in the battery pack, the actuator control module will cause a Battery Shutdown event. In this mode, the actuator moves to a predefined position or limit under battery power, either immediately or after a configurable waiting time.

If it is determined that the mains power present is valid (i.e. present and above a predefined level) and a valid shutdown command is received and the actuator is so configured that the actuator control module will cause a Mains Shutdown event. In this mode, the actuator is moved to a predefined position or limit under mains power, with the battery acting as a standby (if mains power is deemed to be invalid, this can cause an automatic Battery Shutdown event), either immediately or after a preconfigured waiting time.

In more detail, and in accordance with an exemplary embodiment, in a Battery Shutdown event, the valve actuator will, under power received from the battery pack:
Move from any position to fully open limit, stopping on either load (i.e. torque and/or thrust) limit or position
Move from any position to fully closed limit stopping on either load limit or position
Move from any position to any other mid position.

When valid mains power is resumed, the actuator will re-enter normal operation (be this normal, Battery Actuation or Self Contained), provided (or when) the battery pack is sufficiently charged to allow one Shutdown operation.

If at step 104, it is determined that the mains power is valid (and, at step 102, it is determined that the battery is safe to use but requires charging), the actuator control module will, at step 106, commence charging of the battery pack. Within the battery charging process flow loop, the actuator control module once again checks the mains power (at step 108) and also checks (again) whether or not all of the battery safety checks pass (at step 110). If, the mains power remains normal and the battery safety checks all pass, the battery pack charging process flow moves to step 112. At step 112, the actuator control module receives (from a temperature sensor) data representative of the temperature of (and around) the battery cells. It then compares the sensed temperature against a predetermined 'high' threshold. If, compared to the predetermined 'high' threshold, the battery pack temperature is determined to be too high, the actuator control module reduces the charge current to the battery pack (at step 114). This part of the process is iterative, and may be repeated in steps, until the battery pack temperature is determined to be below the 'high' threshold (and/or within a predetermined range). Next, at step 116, the actuator control module compares the current battery pack temperature against a predetermined 'primary low' threshold. If, compared to the predetermined 'primary low' threshold, the battery pack temperature is determined to be too low, the actuator control module is configured to switch on the battery pack heater (at step 118). Once again, this part of the process flow may be iterative, and repeated until the battery pack temperature is determined to be within the temperature range defined between the 'high' threshold and the 'primary low' threshold.

In accordance with an exemplary embodiment of the invention, the charging regime may be adapted according to the age/degree of degradation of the battery pack. Thus, at step 119a, a battery life log is periodically updated. At step 119b, the control module compares the life log against a predetermined benchmark profile. If, at step 119c, it is determined that the battery pack is near the start of its lifespan, it is caused to charge at a predetermined 'low voltage' (step 119d), whereas if it is determined not to be near the start of its lifespan, it is caused to charge at a predetermined 'high voltage' (step 119e).

The charging and temperature detection/management process described above is repeated and continued until an End of Charge signal is detected from the charging circuit (at step 120). At that point, the actuator control module is configured to stop the battery pack from charging (at step 122) and check, once again (at step 123), if the mains power is 'normal'. The process flow also checks (at step 124) whether or not the battery pack has self-discharged and, if so, the process flow returns to step 106 (commence charging).

Thus, to summarise, once the status of the battery pack has been checked (at step 102), if there are no faults on the battery pack (i.e. the battery pack is safe to use), the actuator control module will then decide the next step dependent on the requirement (determined by the current mode of operation). In the case that the requirement is to charge the battery pack, the actuator control module will switch in a constant current/constant voltage source to charge the battery pack as required. The voltage charge level is determined and controlled by the age of the battery cells, the current level is determined by temperature and a user-set charge power.

Any faults detected within the battery pack can be reported to the user (step 125) via the actuator display or the actuator's own status relays or a network system (wired and/or wireless) connected to the actuator. In addition, the actuator control module can decide whether or not to continue to operate based on the above-mentioned sensed parameters and a pre-set user configuration.

During battery charging, and thereafter, the actuator will operate normally, without reference to the battery pack, unless:

a) the battery reports a critical fault (in which case, the actuator control module exits the process flow and generates an error signal to be reported/displayed); or b) valid mains power is removed, a valid shutdown command is received and mains power is removed, or a valid shutdown command is received, mains power is present and the actuator is configured to move on battery in preference (in which case, the actuator control module will enter the Shutdown mode of operation described above).

During charging, the battery management function of the actuator control module will monitor if the battery is safe to use and if the actuator is safe to run. If either of these checks fails, an error status will be flagged. The actuator control module also monitors if valid mains power is lost and/or if a valid shutdown command is received and, if either of these conditions is met, the actuator control module enters the Shutdown mode described above.

Finally, charging will end when the battery reaches a predefined current limit at a predefined voltage level (causing an End of Charge signal to be generated). The predefined voltage level can be varied depending on the age of the battery and ambient temperature. At this point, the battery management function checks the settled battery voltage and, if this is within the predetermined range, the battery pack will enter the above-mentioned idle state until it is determined that it requires charging. If this criterion is not met, the battery management function returns to step 106 and resumes the charging process.

Charging will end, as before, when the battery pack reaches a predefined voltage limit, which can be varied depending on the age of the battery. As before, at this point, the battery management function checks the settled battery voltage If this meets predetermined criteria, the battery pack will enter the above-mentioned idle state until it is determined that it requires charging. If the criteria is not met, the battery management function returns to step 106 and resumes the charging process.

Whenever the battery pack is enabled (at step 126), either in a Battery Shutdown event or in a Battery Actuation event, the battery management function enters the discharging process flow. In this process flow, the actuator control module once again monitors the battery pack temperature, but in this case only compensates for low temperatures, i.e. below a 'primary low' threshold (e.g. 0° C. and a 'secondary low' threshold (e.g. −30° C.). At step 132, the battery management function checks to determine if the temperature is below the primary low threshold. If it is, it causes the heater to be turned on (at step 134). Next, it determines the cell impedance across the battery pack. If so, it isolates the battery pack and stops discharge (at step 130). If not, the process flow returns to step 126 and the battery pack can continue to be utilized.

Of course, another significant advantage of the battery pack and associated active battery management process flow is the fact that the battery pack can be operated in a selected one of many operational modes, rather than the single (passive) Shutdown or failsafe mode provided for in the above-described conventional valve actuators having an integral battery.

In the Shutdown mode, the actuator operates as a 'normal, mains fed electric actuator until the mains power drops below a predetermined threshold and/or a valid shutdown command is received. This may be with or without a configurable time delay between the event and the shutdown action, as described above. The actuator will then make the decision, based on the mains power level and/or nature of the Shutdown command to either commence a Mains shutdown event or a 'Battery Shutdown' event, which has been described previously.

In a Battery Actuation mode, the mains power (whether from the grid or from a renewable energy source) is used to run the peripheral systems of the actuator and charge the battery pack. When the valve is required to be moved, the battery pack discharges to operate the actuator motor and is then recharged between movements. This will be described further as a 'Battery Actuation' event. If so configured the actuator can further commence a 'Battery Shutdown' event if the mains power drops below a predetermined threshold and/or a valid shutdown command is received. This may be with or without a configurable time delay between the event and the Shutdown action as described above and with or without mains power present.

A Self-Contained mode, described below, is similar in many respects to the Battery Actuation mode, wherein additional hardware is provided to allow direct, optimised supply from a renewable energy source and allows additional peripheral items, such as sensors, to be connected. Power derived from, typically, a solar panel is used to run the peripheral systems of the actuator and charge the battery pack. This shall be described as a 'Self-Contained' event. When the valve is required to be moved, the battery pack discharges to operate the actuator motor and is then recharged between movements. This will be described further as 'Battery Actuation'. If so configured the actuator can further commence a 'Battery Shutdown' event if the power drops below a predetermined threshold and/or a valid shutdown command is received and/or the battery become discharged to a predetermined level. This may be with or without a configurable time delay between the event and the Shutdown action as described above.

These additional modes of operation will now be described in more detail.

In the Battery Actuation mode, the actuator control module is able to actuate the valve from an electrical supply less powerful than the power required to run the electro-mechanical actuator. The mains power (whether this be from the grid or a renewable energy source) is used to run the peripheral systems and charge the battery pack. When the valve is required to be moved, the battery pack discharges to operate the actuator (at step 126), described herein as a Battery Actuation Event.

In this mode of operation, a so-called 'Deep Sleep' mode may be utilised (as described below) to maximise the charge going into the battery pack, with an automatic wake up signal being generated when the actuator motor is required to be operated. If it is determined, at step 128, that the battery pack voltage is lower than a predefined cut-off voltage, the actuator control module isolates the battery (at step 130) and an error is flagged.

To enable the Battery Actuation event, the battery management function, in the charging mode, will use the mains power available to charge the battery pack, and the battery pack is used to move the actuator in all cases. In this case, when the actuator wants to run, the actuator control module checks if:

a) There is sufficient battery charge
b) The actuator has been brought out of deep sleep mode
c) The battery us safe to use
d) The actuator is safe to run.

If all these conditions are met the actuator will run from any set position to any set position. A valid input will either be a digital signal, analogue level or network command.

If there is an error with either the battery or actuator, an error is reported and the actuator will decide if is serious enough to prevent operation. If there is insufficient battery charge this will prevent operation until sufficient charge is present.

In order to charge the battery pack, and whilst the battery pack is not being used to move the actuator, the process flow returns to steps 102 and 104. Provided sufficient mains power is present, the battery is safe to use, the actuator is safe to run and the battery requires charge, the actuator control module will commence charging the battery pack (at step 106). During battery charging, and if so configured, the actuator enters a power saving (or 'Deep Sleep') mode and the battery pack is not used until a valid 'Move' command is received. The battery pack will be charged unless the battery reports a critical fault (in which case, an error status is flagged and the system will not run), valid mains power is removed (in which case, the system enters an above-described Battery Shutdown event) or a valid move command is received (in which case, the actuator will run from any set position to any set position, as described above). These parameters are monitored throughout the charging process.

It is to be understood that the above-described Battery Actuation mode may be utilised in a mains powered system and/or, indeed, in a system fed from a renewable energy source, e.g. solar, wind, hydro, etc, and the present invention is not necessarily intended to be limited in this regard. Thus, a so-called Self-Contained mode of operation is also envisaged, and this will now be described in more detail. The Self-Contained mode of operation is very similar to the Battery Actuation mode of operation and the events, Battery Actuation and Battery Shutdown are identical in operation. The key differences are the power source and the ability to make process decisions from a local sensor powered by the actuator and/or communicate information wirelessly back to a control centre for a Move command to be wirelessly sent to the actuator in return.

In the Self-Contained mode of operation, the valve actuator can be powered using an inconsistent power supply derived from, for example, solar panels or wind generators. Power from these devices can be fed directly into the actuator, and can be used instead of a mains power supply in applications where an adequate mains power supply cannot be provided. The actuator control module manages the energy supply and stores energy in the battery pack. The power supply to the actuator runs the peripheral system and charges the battery when there is enough power present, the battery pack then powers the actuator motor and other systems when commanded and/or if there is insufficient power present. As described above, the battery management function can cause the battery to go into a so-called Deep Sleep mode so as to maximise the charge going to the battery, waking only on demand. As in all other modes, status can be reported visually, over wires or wirelessly, and in this case, the device may have the ability to be wired directly to third party sensors and process information based on user-set points.

In this exemplary case the power source is solar radiation through $3^{rd}$ party solar panels. The actuator will have the ability to control and optimise, through power point tracking, the output of the solar panels or other sources and feed the resulting electricity supply into the actuator battery pack. The principal benefit of this system is that the Solar Panel array does not need to be able to directly drive the actuators motor so will use the battery as an accumulator to drive the motor and bridge the gaps in sunlight caused by darkness or shadow. The method of operation shall be as per Battery Actuation mode.

In terms of functionality, in addition to the conventional hard wired commands and networks a valid signal will be received wirelessly. The actuator may reply with status information back over the same wireless communications. This allows a totally self-contained solution.

The final aspect of this is the attachment of external sensors (e.g. pressure sensor). This allows the actuator to make internal process decisions and vary its own set point either with or without reference to a central control set point. If the process moves outside of set parameters the actuator can send a warning message over the wired or wireless communications to the control.

In the event of a total loss of power, due to, for example, the failure of a solar panel, the actuator will move from any position to a pre-set set safe position and report an alarm, either wired or wirelessly in an as-described Battery Shutdown event.

It will be appreciated by a person skilled in the art, from the foregoing description, that modifications and variations can be made to the described embodiments without departing from the scope of the invention as defined by the appended claims.

The invention claimed is:

1. A motor driven industrial actuator device, comprising:
an actuator enclosure housing:
an actuator motor in the form of a reversible electric motor;
a control module; and,
a drive comprising a shaft, the drive being configured to couple the actuator motor to a valve or damper to be actuated via the shaft;
an input for receiving an external power supply; and,
a battery pack housed within the actuator enclosure, the battery pack being electrically connected to selectively drive the actuator motor, and being electrically connectable to the external power supply for charging;
wherein the control module is configured to:
receive data representative of a status of the external power supply;

receive data representative of a charge state, a status of the battery pack, or data representative of a charge state and a status of the battery pack;

cause the battery pack to be charged from the external power supply when the external power supply is determined to be valid and present, and the battery pack requires charging;

wherein the control module is configurable to operate in a plurality of modes, events and actions of operation in addition to a shutdown mode, wherein the plurality of modes, events and actions of operation include battery actuation and self contained modes, mains shutdown, battery shutdown and battery actuation events;

wherein in the battery actuation mode, the control module is configured to cause the external power supply to operate ancillary systems of the motor driven industrial actuator device, including causing the battery pack to be charged by the external power supply until it receives a move command and, in response to the move command, causes the battery pack to cause the motor driven industrial actuator device to be moved under power from the battery pack, in the form of a battery actuation event, and the battery pack to be discharged;

wherein, in the shutdown mode, the control module is configured to move the actuator to any other mid position, any other limit of movement, or any other mid position and any other limit of movement;

wherein, in the battery shutdown event in which mains power is not present, the control module is configured to move the actuator, under power received from the battery pack, from any position to a fully open limit, from any position to a fully closed limit, or from any position to any other mid position, and when valid mains power is resumed, cause the actuator to recommence operation provided that the battery pack is sufficiently charged to allow one shutdown operation;

wherein the motor driven industrial actuator device further comprises at least one temperature sensing device associated with the battery pack;

wherein the control module is further configured, during charging of the battery pack to:

receive from the at least one temperature sensing device, data representative of a measured temperature associated with the battery pack;

compare the measured temperature with a first predetermined threshold temperature; and, if the measured temperature is greater than the first predetermined threshold temperature, cause a charging current delivered from the external power supply to the battery pack to be reduced to prolong the life of the battery pack.

2. A motor-driven industrial actuator device according to claim 1, wherein if the measured temperature is greater than the first predetermined threshold temperature, the control module is configured to cause the charging current delivered from the external power supply to the battery pack to be reduced until the measured temperature is at or below the first predetermined threshold temperature.

3. A motor-driven industrial actuator device according to claim 1, the battery pack comprising a plurality of secondary lithium/nickel metal hydride/nickel cadmium cells arranged and configured for use in explosion-proof environments.

4. A motor-driven industrial actuator device according to claim 1, further comprising at least one heating device associated with the battery pack, and wherein the control module is further configured, during charging of the battery pack, to compare the measured temperature with a second predetermined threshold temperature and, if the measured temperature is less than the second predetermined threshold temperature, cause the at least one heating device to be switched on until the measured temperature is at or above the second predetermined threshold temperature.

5. A motor-driven industrial actuator device according to claim 1, wherein the external power supply is a renewable energy source, a harvested energy source, or a renewable and harvested enemy source.

6. A motor-driven industrial actuator device according to claim 1, further comprising ancillary systems.

7. A motor-driven industrial actuator device according to claim 6, wherein the ancillary systems comprise sensors, transducers, and sensors and transducers connected by wired or wireless communication means to a remote location for monitoring process conditions in respect of actuator device, and reporting data representative thereof.

8. A motor-driven industrial actuator device according to claim 7, wherein the communication means is only enabled when data is required to be transmitted to or from the remote location.

9. A motor-driven industrial actuator device according to claim 6, wherein the external power supply is configured to run the ancillary systems of the motor-driven industrial actuator device.

10. A motor-driven industrial actuator device according to claim 6, wherein the external power supply charges the battery pack and the battery pack is configured to run the ancillary systems and to selectively drive the actuator motor.

11. A motor-driven industrial actuator device according to claim 1, comprising the control module being integral and configured to:

control the selective drive of the actuator motor according to a defined control process; and receive, from a remote location, data configured to update, alter and update and alter the control process.

12. A motor-driven actuator device according to claim 1, wherein the control module is configured to communicate a battery pack charge level, battery pack status, battery pack faults, or battery pack charge level, battery pack status, and battery pack faults to a user, remotely, via a wired or wireless network, or remotely and via a wired or wireless network, optionally in the form of a data log.

13. A motor-driven industrial actuator device according to claim 1, wherein the control module may be configured to prevent actuator operation should the control module: (a) determine a fault condition in the battery pack, (b) determine that the charge level of the battery pack is below that able to allow a shutdown event, or (c) a combination of (a) and (b).

14. A motor driven industrial actuator device comprising:
an actuator enclosure housing:
an actuator motor in the form of a reversible electric motor;
a control module; and,
a drive comprising a shaft, the drive being configured to couple the actuator motor to a valve or damper to be actuated via the shaft;
an input for receiving an external power supply; and,
a battery pack housed within the actuator enclosure, the battery pack being electrically connected to selectively drive the actuator motor, and being electrically connectable to the external power supply for charging;
wherein the control module is configurable to operate in a plurality of modes, events and actions of operation in addition to a shutdown mode;

wherein, in the shutdown mode, the control module is configured to move the actuator to any other mid position, any other limit of movement, or any other mid position and any other limit of movement;

wherein, in the battery shutdown event in which mains power is not present, the control module is configured to move the actuator, under power received from the battery pack, from any position to a fully open limit, from any position to a fully closed limit, or from any position to any other mid position, and when valid mains power is resumed, cause the actuator to recommence operation provided that the battery pack is sufficiently charged to allow one shutdown operation;

wherein the battery pack comprises a plurality of secondary lithium/nickel metal hydride/nickel cadmium cells arranged and configured for use in explosion-proof environments.

15. A motor-driven industrial actuator device according to claim 14, further comprising a balanced charging circuit and a circuit configured to provide over voltage, over current and under voltage protection in respect of the battery cells.

\* \* \* \* \*